UNITED STATES PATENT OFFICE 2,359,305

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application February 12, 1941, Serial No. 378,600

2 Claims. (Cl. 260—205)

This invention relates to new arylazo dye compounds and their application for the coloration of textile materials in the form of threads, yarns, fibers and fabrics. Coloration can be effected by dyeing, printing, stenciling or like methods.

We have discovered that the azo compounds having the general formula:

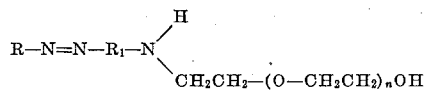

wherein R represents the residue of a member selected from the group consisting of an aryl nucleus of the benzene series, a naphthalene nucleus, a benzothiazole nucleus and a benzoxazole nucleus, $R_1$ represents the residue of a member selected from the group consisting of a benzene nucleus and a naphthalene nucleus, $n$ stands for 1 or 2 and wherein the

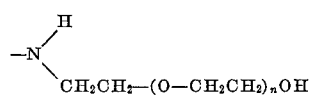

grouping is attached to the nucleus designated $R_1$ in para position to the azo bond, constitute a valuable class of dye compounds.

Compounds of our invention containing no nuclear sulfonic acid group in either its free acid or salt form have been found to be especially of value for the coloration of organic derivatives of cellulose and it is to these compounds and their application for the coloration of organic derivatives of cellulose that our invention is particularly directed. These nuclear non-sulfonated compounds likewise possess application for the dyeing of wool, nylon, Vinyon, and silk. Compounds wherein R and $R_1$ are the residue of benzene nuclei are particularly of value for the coloration of cellulose esters, especially cellulose acetate silk. Preferably, when the dye compounds of our invention are to be employed for the coloration of organic derivatives of cellulose they should contain no nuclear carboxylic acid group in its free acid or salt form.

The nuclear sulfonated compounds of our invention have little or no utility for the dyeing of organic derivatives of cellulose but possess application for the dyeing of wool and silk. These compounds can be prepared by sulfonation of the unsulfonated dye compounds in known fashion or by the use of sulfonated components. Rubine, yellow, orange-yellow, orange, blue, blue-green, wine and violet shades, for example, can be obtained employing the dye compounds of our invention.

It is an object of our invention to provide a new class of azo dye compounds suitable for the coloration of organic derivatives of cellulose, nylon, Vinyon, wool and silk. Another object of our invention is to provide a process for the coloration of organic derivatives of cellulose, nylon, Vinyon, wool and silk. A further object is to provide colored textile materials which are of good fastness to light and washing. A particular object of our invention is to provide a new class of nuclear non-sulfonated azo dyes suitable for the coloration of cellulose acetate silk. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention can be prepared by diazotizing diazotizable members selected from the group consisting of an arylamine of the benzene series, a naphthylamine, an aminobenzoxazole and an aminobenzothiazole and coupling the diazonium compounds obtained with the coupling compounds having the general formula:

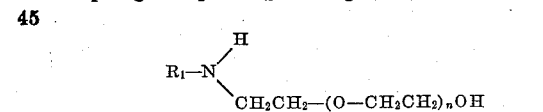

wherein $n$ and $R_1$ have the meaning previously assigned to them. When R₁ is a naphthalene nucleus it is generally advantageous that it contain a hydroxy group in either or both the 5 and 8 positions.

It will be understood that the nuclei designated R and R₁ can be substituted or unsubstituted. These nuclei can be substituted for example, with the substituents customarily present on such nuclei; a considerable number of which are shown hereinafter. To illustrate when R₁ is the residue of a naphthalene nucleus it can contain a hydroxy or a halogen atom such as chlorine or bromine in the 5 and 8 positions. Similarly a chloro, bromo, sulfo, nitro, amino, hydroxy, cyano or carboxyl group, for example, can be present in the 2 or 3 positions of the naphthalene nucleus. From this and the examples given hereinafter it is believed that it will be apparent in what manner the nuclei R and R₁ can be substituted.

Compounds having the general formula:

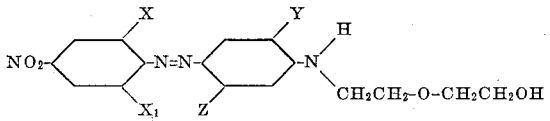

wherein X and X₁ each represents a member selected from the group consisting of hydrogen, a nitro group, a halogen atom, an alkylsulfone and a sulfonealkylamide group, Y represents a member selected from the group consisting of hydrogen, a halogen atom and an alkoxy group and Z represents a member selected from the group consisting of hydrogen, an alkyl group and an acylamino group, appear to be particularly valuable, especially for the dyeing of cellulose acetate silk.

The following examples illustrate the preparation of the azo dye compounds of our invention.

*Example 1*

12.8 grams of o-chloroaniline are dissolved in 150 cc. of water to which has been added 25 cc. of 36% hydrochloric acid and the resulting solution is cooled to 0–10° C. by the addition of ice, for example. The o-chloroaniline is diazotized by adding, with stirring, while maintaining a temperature of 0–10° C., 6.9 grams of sodium nitrite dissolved in water.

18.1 grams of N-[β-(β-hydroxyethoxy)-ethyl]-aniline are dissolved in a dilute aqueous hydrochloric acid solution and the resulting solution is cooled to a temperature approximating 10–15° C. and the diazonium solution prepared as described above is added, with stirring, while maintaining a temperature of 10–15° C. After addition of the diazonium solution the reaction mixture is permitted to stand for a short time after which it is slowly made neutral to Congo red paper by the addition of sodium acetate. Upon completion of the coupling reaction which has taken place the dye compound formed is recovered by filtration, washed with water and dried. The dye compound obtained colors cellulose acetate silk, wool and silk yellow.

*Example 2*

21.6 grams of 2-amino-5-nitrophenylmethylsulfone are diazotized and the diazonium compound obtained is coupled with 19.4 grams of N-[β-(β-hydroxyethoxy)-ethyl]-m-toluidine. The diazotization, coupling and dye recovery operations can be carried out in accordance with the general methods described in Example 1. The dye compound obtained colors cellulose acetate silk, wool and silk violet.

An equivalent gram molecular weight of 2-amino-5-nitrophenylethylsulfone, 2-amino-5-nitrophenylpropylsulfone and 2-amino-5-nitrophenylbutylsulfone, for example, can be substituted for the 2-amino-5-nitrophenylmethylsulfone of the example to obtain dye compounds which similarly color cellulose acetate silk, wool and silk violet.

*Example 3*

13.5 grams of p-aminoacetophenone are diazotized in known fashion and the diazonium compound obtained is coupled with 25.9 grams of N-{β[β-(β-hydroxyethoxy)-ethoxy]-ethyl}-m-chloroaniline. Coupling and recovery of the dye compound formed can be carried out in accordance with the general method described in Example 1. The dye compound obtained colors cellulose acetate silk, wool and silk orange-yellow.

*Example 4*

13.8 grams of p-nitroaniline are diazotized in known fashion and the diazonium compound obtained is coupled with 22.5 grams of 1-[β-(β-hydroxyethoxy)-ethylamino]-2-methoxy-5-methylbenzene. Coupling and recovery of the dye compound formed can be carried out in accordance with the general method described in Example 1. The dye compound obtained colors cellulose acetate silk, wool and silk red.

*Example 5*

17.3 grams of 1-amino-2-chloro-4-nitrobenzene are diazotized in known fashion and the diazonium compound obtained is coupled with 27.8 grams of 1-{β-[β-(β-hydroxyethoxy)-ethoxy]-ethylamino}-2-methoxy-5-chlorobenzene. Coupling and recovery of the dye compound formed can be carried out in accordance with the general method described in Example 1. The dye compound obtained colors cellulose acetate silk, wool and silk rubine.

21.7 grams of 1-amino-2-bromo-4-nitrobenzene can be substituted for the 1-amino-2-chloro-4-nitrobenzene of the example to obtain a dye compound which similarly colors the materials above named rubine.

Similarly equivalent gram molecular weights of 1-{β-[(β-hydroxyethoxy)-ethoxy]-ethylamino}-2-methoxy-5-bromo (or iodo) benzene can be substituted for the coupling component of the example to obtain dye compounds which color the materials above named rubine.

*Example 6*

23.1 grams of 1-amino-4-nitrophenyl-6-monomethyl-sulfoneamide having the formula

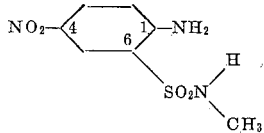

are diazotized and the diazonium compound obtained is coupled with 23.8 grams of 1-[β-(β-hydroxyethoxy)-ethylamino]-3-acetylaminobenzene. Coupling and recovery of the dye compound formed can be carried out in accordance with the general method described in Example 1. The dye compound obtained colors cellulose acetate silk, wool and silk rubine.

Similarly equivalent gram molecular weights of 1-amino-4-nitrophenyl-6-mono (ethyl, propyl or butyl)-sulfoneamide can be substituted for the sulfoneamide compound of the example to obtain dyes which color cellulose acetate silk, wool and silk rubine.

*Example 7*

17.3 grams of 1-amino-2-chloro-4-nitrobenzene are diazotized and the diazonium compound obtained is coupled in a cooled dilute sulfuric acid solution with 24.8 grams of 1-[β-(β-hydroxyethoxy)-ethylamino]-5-naphthol. Coupling and recovery of the dye compound formed can be completed in accordance with the general method described in Example 1. The dye compound obtained colors cellulose acetate silk, wool and silk blue.

*Example 8*

26.2 grams of 1-amino-2,4-dinitro-6-bromobenzene are diazotized and the diazonium compound obtained is coupled with 26.2 grams of 1-{β-[β-(β-hydroxyethoxy)-ethoxy]-ethylamino}-5-naphthol. Coupling and recovery of the dye compound formed can be carried out in accordance with the general method described in Example 1. The dye compound obtained colors cellulose acetate silk, wool and silk a blue-green shade.

*Example 9*

18.2 grams of benzidine are completely diazotized in known fashion and the diazonium compound obtained is coupled with 36.2 grams of N-[β-(β-hydroxyethoxy)-ethyl]-aniline. Coupling and recovery of the disazo dye compound formed can be carried out in accordance with the general procedure described in Example 1. The dye compound obtained colors wool and silk, and to some extent, cellulose acetate silk orange-yellow.

*Example 10*

25.6 grams of p-nitrobenzeneazo-m-toluidine are added to 400 cc. of water and diazotized at 20° C. with 6.9 grams of sodium nitrite.

The diazonium solution prepared as described above is coupled with 21 grams of 1-[β-(β-hydroxyethoxy)-ethylamino]-2,5-dimethylbenzene. Coupling and recovery of the dye compound formed can be carried out in accordance with the general method described in Example 1. The dye compound obtained colors cellulose acetate silk, wool and silk rubine.

It will be understood that other monoazo compounds containing a free amino group and capable of diazotization can be diazotized and coupled with the coupling component of this example or any of those disclosed herein to obtain dye compounds of our invention. p-Nitrobenzeneazoaniline, 1-chloro-4-nitrobenzeneazo-o-anisidine and p-aminoazobenzene, for example, are illustrative of such monoazo compounds. Further, it will be understood that the monoazo diazo components just described, as well as a benzidine diazo component are included within the expression "an aryl nucleus of the benzene series."

*Example 11*

18 grams of 6-methoxy-2-aminobenzothiazole,

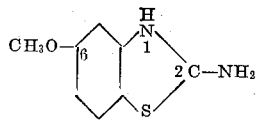

are diazotized in known fashion and the diazonium compound obtained is coupled in a cold dilute sulfuric acid solution with 21.6 grams of 1-[β-(β-hydroxyethoxy)-ethylamino]-2-chlorobenzene. The dye compound obtained colors cellulose acetate silk, wool and silk orange.

*Example 12*

13.8 grams of p-nitroaniline are diazotized and the diazonium compound obtained is coupled with 21.6 grams of 1-[β-(β-hydroxyethoxy)-ethylamino]-2-chlorobenzene. The dye compound obtained colors cellulose acetate silk, wool and silk orange.

*Example 13*

The diazonium compound of Example 12 is coupled with 18.1 grams of N-[β-(β-hydroxyethoxy)-ethyl]-aniline to obtain a dye compound which colors cellulose acetate silk, wool and silk orange.

*Example 14*

17.3 grams of 1-amino-2-chloro-4-nitrobenzene are diazotized and the diazonium compound obtained is coupled with 19.5 grams of 1-[β-(β-hydroxyethoxy)-ethylamino]-3-methylbenzene to obtain a dye compound which colors cellulose acetate silk, wool and silk red.

We would here note that the dye compounds of Examples 12, 13 and 14 are generally superior with respect to their light and gas fastness properties on cellulose acetate silk and possess excellent affinity for this material—dyeing it rapidly at temperatures as low as 60–65° C.

*Example 15*

The diazonium compound of Example 15 is coupled with 24.8 grams of 1-[β-(β-hydroxyethoxy)-ethylamino]-8-naphthol to obtain a dye compound which colors cellulose acetate silk, wool and silk blue.

26.5 grams of 1-[β-(β-hydroxyethoxy)-ethylamino]-5,8-dihydroxynaphthalene can be substituted for the coupling component of the example to obtain a dye compound which colors the materials named blue.

*Example 16*

34.1 grams of H-acid (1-amino-8-naphthol-3,6-disulfonic acid) are diazotized and the diazonium compound obtained is coupled with 47 grams of

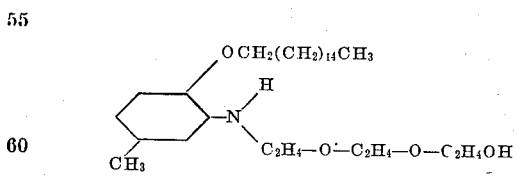

The dye compound formed is obtained by salting out with NaCl and filtering and colors wool and silk blue.

The following tabulation further illustrates the compounds included within the scope of our invention together with the colors they yield on cellulose acetate silk. The compounds indicated below can be prepared by diazotizing the amines listed under the heading "Amine" and coupling the diazonium compounds obtained with the compounds specified in the column entitled "Coupling component." The diazotization and coupling reactions may, for example, be carried out following the general procedure described hereinbefore.

| Amine | Coupling component | Color |
|---|---|---|
| o-(F, Cl, Br, I)-aniline | 1. N-[β-(β-hydroxyethoxy)-ethyl]-aniline | Yellow. |
| Do | 2. N-{β-[β-(β-hydroxyethoxy)-ethoxy]-ethyl}-aniline | Do. |
| Do | 3. 1-{β-[β-(β-hydroxyethoxy)-ethoxy]-ethylamino}-3-bromobenzene. | Do. |
| Do | 4. 1-[β-(β-hydroxyethoxy)-ethylamino]-3-chlorobenzene | Do. |
| Do | 5. 1-[β-(β-hydroxyethoxy)-ethylamino]-3-ethoxy-benzene | Do. |
| Do | 6. 1-{β-[β-(β-hydroxyethoxy)-ethoxy]-ethylamino}-3-propoxybenzene. | Do. |
| Do | 7. 1-{β-[β-(β-hydroxyethoxy)-ethoxy]-ethylamino}-2-methoxy-5-ethoxybenzene. | Do. |
| Do | 8. 1-[β-(β-hydroxyethoxy)-ethylamino]-3-propionyl-aminobenzene. | Do. |
| Do | 9. 1-{β-[β-(β-hydroxyethoxy)-ethoxy]-ethylamino}-2-bromobenzene. | Do. |
| 1-amino-4-nitrophenyl-6-di (methyl, ethyl, propyl, butyl)-sulfoneamide. | 1-9 above | Red to violet. |
| 1-amino-4-nitrophenyl-6-methylethylsulfoneamide | do | Do. |
| 1-amino-4-nitrophenyl-2,6-di-monoethylsulfoneamide | do | Do. |
| 1-amino-2-chloro-5-methoxybenzene | do | Yellow. |
| 1-amino-2-chloro-4-methylbenzene | do | Do. |
| o-Nitroaniline | do | Orange. |
| 1-amino-2-nitro-4-ethylbenzene | do | Orange-to-red. |
| 2,4-dinitroaniline | do | Rubine to violet. |
| α-Naphthylamine | do | Orange. |
| 2,4-dinitro-α-naphthylamine | do | Red-blue. |
| 1-amino-2-hydroxy-4-nitrobenzene | do | Pinkish-red. |
| 2-amino-6-ethoxybenzothiazole | do | Red. |
| 2-amino-6-methoxybenzoxazole | do | Do. |
| p-Nitroaniline | 10. 1-[β-(β-hydroxyethoxy)-ethylamino]-naphthalene | Rubine. |
| Do | 11. 1-[β-(β-hydroxyethoxy)-ethylamino]-5-naphthol | Blue. |
| Do | 12. 1-[β-(β-hydroxyethoxy)-ethylamino]-8-naphthol | Do. |
| Do | 13. 1-{β-[β-(β-hydroxyethoxy)-ethoxy]ethylamino}-5,8-dihydroxynaphthalene. | Do. |
| Do | 14. 1-[β-(β-hydroxyethoxy)-ethylamino]-5-chloronaphthalene. | Rubine. |
| 1-amino-2-bromo-4-nitrobenzene | 10-14 above | Rubine to blue. |
| 2,4-dinitro-6-chlorobenzene | do | Violet to blue-green. |
| 2-amino-6-methoxybenzothiazole | do | Rubine to blue. |
| 2-amino-6-methoxybenzoxazole | do | Do. |
| p-Nitrobenzeneazo-m-toluidine | do | Do. |
| 2-amino-5-nitrophenylmethylsulfone | do | Do. |

Nuclear sulfonated diazo compounds corresponding to the nuclear non-sulfonated diazo compounds shown herein can be prepared by sulfonating said non-sulfonated compounds or by employing sulfonated diazo components. Sulfonation can be effected for example with chlorosulfonic acid or fuming sulfuric acid. Suitable sulfonated amines which can be diazotized and coupled with any of the coupling components shown herein include, for example, m-sulfanilic acid, p-sulfanilic acid, 1-amino-2-sulfo-4-nitrobenzene, 1-amino-2-nitro-4-sulfobenzene, 1-amino-2-sulfo-4-bromobenzene, 1-amino-2-chloro-4-sulfobenzene and 1-amino-2-sulfonaphthalene.

We would here note that, while the nuclear non-sulfonated compounds have been described principally in connection with the dyeing of cellulose acetate silk, wool and silk they can, as stated hereinbefore, also be employed for the dyeing of nylon and Vinyon, yielding the same general colors on these materials as indicated for cellulose acetate silk.

It will be understood that the specific dye compounds shown herein are intended to be illustrative and not limitative of the invention. Any of the amines disclosed herein may be diazotized and the diazonium compounds obtained coupled with any of the coupling components shown herein to obtain dye compounds included within the scope of our invention.

In order that our invention may be more clearly understood it is here noted that the coupling components employed in the preparation of the azo dye compounds of our invention can be prepared by treating an appropriate aminobenzene or aminonaphthalene compound with a compound having the formula:

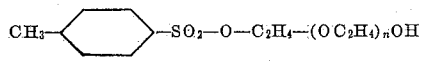

or the formula $X-C_2H_4-(OC_2H_4)_nOH$ wherein X is chlorine or bromine and $n$ is 1 or 2. Compounds of the latter formula can be prepared by reacting diethylene glycol and triethylene glycol, respectively, with hydrochloric and hydrobromic acids. Compounds of the first formula can be prepared by reacting p-toluene sulfonic acid with a compound of the formula $$X-C_2H_4-(OC_2H_4)_nOH$$

wherein X and $n$ have the meaning previously assigned to them.

The coupling components of our invention can also be prepared by heating an appropriate aminobenzene or aminonaphthalene compound with a glycol having the formula $$HOCH_2CH_2(OCH_2CH_2)_nOH$$

wherein $n$ stands for 1 or 2 in the presence of a catalyst such as Raney nickel. N-[β-(β-hydroxyethoxy)-ethyl]-aniline and 1-[β-(β-hydroxyethoxy)-ethylamino]-naphthalene can be prepared, for example, by heating aniline and α-naphthylamine, respectively, with diethylene glycol in a suitable reaction vessel in the presence of Raney nickel and continuing the reaction until one hydrogen of the amino group has been replaced by a —CH₂CH₂—OCH₂CH₂OH grouping.

The azo dye compounds of our invention can be employed for the coloration of textile materials such as those named herein by methods well known to the art for the coloration of these materials. For the most part the azo dye compounds of our invention are relatively insoluble in water and, therefore, the dispersion method is well adapted for their application to textile materials. For a description of how the insoluble azo dyes of our invention can be applied, reference may be had to our U. S. Letters Patent No. 2,115,030, issued April 26, 1938. Those compounds of our invention, which are relatively soluble in water can be applied directly from their water solutions as is well known in the art.

We claim:
1. The azo dye compound having the general formula:
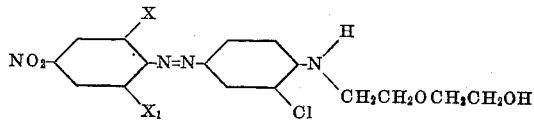
wherein X and X₁ each represents a member selected from the group consisting of hydrogen, a nitro group, a halogen atom, an alkylsulfone and a sulfonealkylamide group.
2. The azo dye compound having the formula:
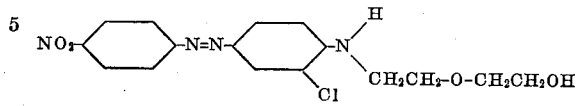
JOSEPH B. DICKEY.
JAMES G. McNALLY.